July 17, 1928.

W. L. MORRISON 1,677,403

CLOSURE CAP

Filed April 25, 1925

Inventor
W. L. Morrison
by W. H. Lieber
Attorney

Patented July 17, 1928.

1,677,403

UNITED STATES PATENT OFFICE.

WILLARD L. MORRISON, OF MELROSE, MASSACHUSETTS.

CLOSURE CAP.

Application filed April 25, 1925. Serial No. 25,733.

The present invention relates in general to improvements in closures, and relates more specifically to improvements in the construction of and in the manner manipulating closure caps for the inlet openings of liquid storage reservoirs such as the fuel supply tanks of automobiles and the like.

An object of the invention is to provide an improved closure cap which is simple in construction and efficient in operation.

It is common practice in the automobile industry, to store the liquid fuel supply for the propelling motor of each car, in a reservoir or tank. The storage tank is ordinarily provided with a readily accessible inlet or supply opening which is normally sealed by means of a removable cap having screw thread coaction with an integral portion of the tank. In the Ford car, the supply tank is now located below the front seat and the closure cap which is externally threaded, coacts with internal screw threads of the tank supply opening, the top of the cap being substantially flush with the top of the tank. All of the prior fuel supply tank closure caps are extremely objectionable for various reasons. Since the cap is not positively attached to the tank in any manner, it is frequently lost either by misplacement after voluntary removal or by automatic displacement of the cap during operation of the vehicle. The prior threaded caps are also rather difficult to apply and remove and are often battered and broken during removal when the threads become jammed. It also requires considerable time to properly apply and remove a threaded cap when filling or inspection of the tank is necessary. While the foregoing are the major objections to the screw threaded caps now universally employed, there are many other minor objections.

The present invention contemplates provision of an improved closure cap especially applicable to the fuel supply tank of the Ford car, which may be conveniently opened and tightly closed, and which is permanently attached to the tank. The improved closure cap has a slip fit with the tank supply opening, and is automatically and positively retained in both open and closed position. Besides being of extremely neat appearance and mechanical in structure, the improved device may be quickly applied by a novice to any standard tank, being formed for attachment directly to the standard screw threads of the tank supply opening. The appliance is formed to permit unobstructed admission of fuel to the tank, embodies no objectionable projecting parts, and may be constructed for application as an accessory to any type of tank. These and other objects and advantages attainable with the present invention, will be apparent in the course of the following description.

A clear conception of an embodiment of the invention especially applicable to the fuel supply tank of a Ford car, and of the mode of manipulating such a device, may be had by referring to the drawing accompanying and forming a part of this specification in which like reference characters designate the same or similar parts in the various views.

Figure 3:
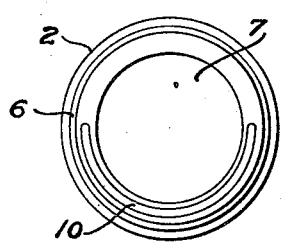
Fig. 3 is a bottom view of the seating element or ring and of the guide means, of the improved closure cap.

The improved closure cap specifically illustrated, comprises in general a seating element or ring 2 having external screw threads 6 and a central circular supply opening 7; a sealing element or cap 3 movable rectilinearly toward and away from the opening 7 and in line therewith; and guide means consisting of a single wire 4 rigidly attached to the cap 3 and having parallel rod portions 5 which frictionally and slidably engage holes penetrating the ring 2. The reservoir or tank 11 has a supply opening provided with internal screw threads 12 with which the element threads 6 are adapted to coact as shown. The closure cap 3 has a lower circular projection 9 which is adapted to enter and snugly fit the central opening 7 of the seating element 2 and also has a lower transverse surface 13 formed for coaction with the upper transverse surface 14 of the seating element 2. The cap 3 may if desired be formed of sheet metal and may also be provided with a vent opening 15 as shown. The guide means or wire 4 comprises the laterally spaced parallel rod portions 5 connected at their lower ends by means of a bent portion 10 and at their upper ends by means of the handle portion 8. The bent lower wire portion 10 is semi-circular as shown in Fig. 3 in order to avoid obstruction below the opening 7. The ends of the single wire may be integrally united at the medial part of the handle portion 8 by welding, brazing or soldering. The portion 16 of the lower cap projection 9 and the adjacent upper portion 17 of the wire 4 are preferably distorted toward each other so as to exert a clamping pressure upon the intervening portion of the element 2 when the cap 3 is closed.

After the seating element 2 and the cap 3 have been properly formed, a single wire having straight parallel side rod portions 5 connected at their lower ends by a previously bent portion 10, is inserted in the alined holes in the element 2 and the cap 3. The upper ends of the rod portions 5 may then be bent laterally and united to form the handle 8 and to permanently connect the element 2 and the cap 3. After such union has been accomplished, the wire 4 may be rigidly attached to the cap 3 by utilizing a center punch to distort the portions of the cap 2 through which the wire passes. The rod portions 5 of the wire 4 are however permitted to slide snugly in the side holes of the element 2 so that the cap 3 will be frictionally retained in any position of adjustment within the limits afforded by the rod portions 5. The wire portion 17 may subsequently be distorted to produce the desired locking effect, whereupon the device is completely assembled.

Figure 2:
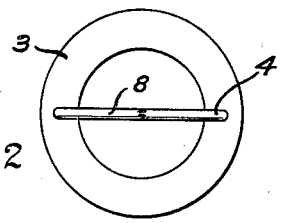
Fig. 2 is a top view of the improved closure cap.
Figure 4:
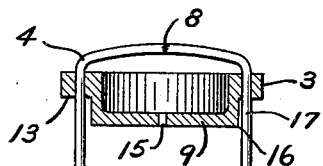
Fig. 4 is a side elevation of the improved closure cap applied to a tank, the cap being in extreme open position.
Figure 4:
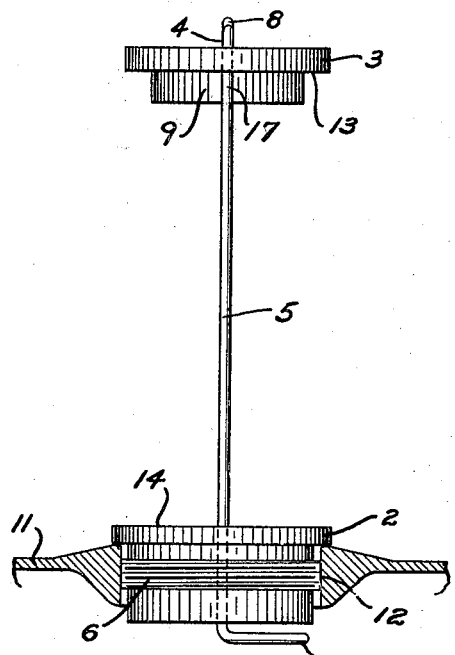
Figure 1:
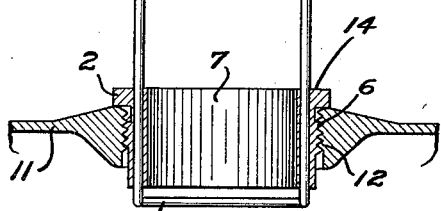
Fig. 1 is a central vertical section through an improved closure cap applied to the inlet opening of a fuel supply tank, the cap being shown in extreme open position.
Figure 5:
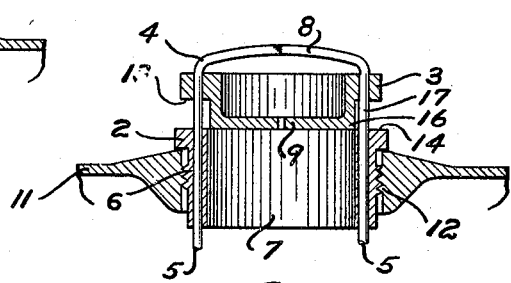
Fig. 5 is a fragmentary central vertical section through an improved closure cap applied to a tank, showing the cap in position just prior to closing.

With the device completely assembled, it may be readily inserted in operative position with respect to a tank 11 as shown in Figs. 1, 4 and 5, upon removal of the ordinary tank closure cap. When the improved device has been thus applied, the cap 3 may be elevated to the position shown in Fig. 1 or to any intermediate position by merely pulling upwardly upon the handle 8. With the cap 3 in uppermost position, the tank 11 may be filled by insertion of the ordinary filling hose nozzle, without interference by the cap 3 or the rod portions 5. In order to close the cap 3, it is only necessary to press downwardly thereagainst thus causing the cap 3 to eventually assume the position shown in Fig. 5. Upon further application of downward pressure, the wire portion 17 is suddenly sprung outwardly causing the cap 3 to close completely with a snap and locking the cap in closed position. The clamping action afforded by the distorted rod portion 17 while being sufficient to retain the cap 3 tightly closed, is not however sufficient to prevent ready opening thereof.

It will thus be noted that the improved closure cap besides being readily attachable to a standard threaded tank 11, may be conveniently opened and closed by merely pulling or pushing on the cap 3. The rod portions 5 of the single wire 4 effectively guide and retain the cap 3 in any desired position, and prevent loss thereof. By forming the guide means of a single wire 4, the structure is reduced to its simplest form as the entire device comprises only three parts. By utilizing only two laterally spaced rods portions 5 and a bent lower portion 10, obstruction to filling is entirely eliminated. In case a tighter closure is desired, a suitable washer may readily be placed between the cooperating surfaces 13, 14 in an obvious manner. While the invention is disclosed herein as being specifically applicable to Ford fuel tanks, it is not contemplated to thereby impose limitations upon the claims.

It should be understood that it is not desired to limit the invention to the exact details of construction herein shown and described, for obvious modifications within the scope of the claims may occur to persons skilled in the art.

It is claimed and desired to secure by Letters Patent:—

1. In combination, an annular element having external screw threads and a central opening, a closure cap movable toward and away from said opening, and guide means comprising parallel rod portions carried by said cap and frictionally engaging said element beyond the periphery of said opening.

2. In combination, an annular element having a central opening and peripheral screw threads, a cap movable in line with said opening, and guide means rigidly attached to said cap and comprising parallel rod portions slidable through openings in said element, said rod portions being formed to frictionally retain said cap in open position relatively to said opening.

3. In combination, a seating element having an opening, a cap movable in line with said opening, and guide means connecting said element and said cap, said cap having a projection formed to enter said opening and said guide means having a resilient portion cooperable with said projection to lock said cap in closed position relatively to said element.

4. In combination, an annular seating element having an opening and a surface extending transversely of said opening; a cap having a projection adapted to enter said opening and having a surface coactable with said element surface; and guide means permanently connecting said element and said cap, said guide means being formed to lock said cap to said element when said projection is disposed within said opening.

5. In combination, an annular element having an external screw thread, a central opening, and holes on opposite sides of said central opening, a cap movable toward and away from said opening, and a guide rigidly attached to said cap and having rod portions frictionally engageable with said holes.

6. In combination, an element having an opening, a cap movable toward and away from said opening, and a guide connecting said element and said cap, said guide comprising a continuous wire the lower portion of which is bent to follow the contour of said opening to avoid obstruction in line with said opening.

7. In combination, an element having an opening, a cap movable to close said opening, and a single wire forming a handle for moving said cap and providing parallel guide rods frictionally engaging said element on opposite sides of said opening.

8. In combination, an element having external screw threads and a central opening, a cap movable to close said opening, and a single wire guide forming a handle for moving said cap and providing parallel guide rods penetrating said element at the inner side of said screw threads.

9. In combination, an element having an opening, a cap movable to close said opening, and a single wire guide forming parallel guide rods on opposite sides of said opening, the lower end of said wire being bent to clear said opening and the upper end thereof forming a handle for moving said cap.

10. In combination, an element having an opening, a cap movable toward and away from said opening, and guide means comprising parallel rod portions carried by said cap and frictionally engaging said element beyond the periphery of said opening.

11. In combination, an element having an opening, a cap movable toward and away from said opening, and guide means comprising parallel rod portions penetrating said element and frictionally engaging the same beyond the periphery of said opening.

12. In combination, an element having an opening, and holes adjacent thereto, a cap movable toward and away from said opening, and guide rods carried by said cap and frictionally engaging said holes to retain said cap in open position.

In testimony whereof, the signature of the inventor is affixed hereto.

WILLARD L. MORRISON.